C. H. HOPKINS.

Water and Steam Valves.

No. 124,269.  Patented March 5, 1872.

Witnesses.  Charles H. Hopkins, Inventor,
  By S. A. Curtis.
  his Atty.

124,269

UNITED STATES PATENT OFFICE.

CHARLES H. HOPKINS, OF LYNDONVILLE, VERMONT.

IMPROVEMENT IN WATER AND STEAM VALVES.

Specification forming part of Letters Patent No. 124,269, dated March 5, 1872.

*To all whom it may concern:*

Be it known that I, CHARLES H. HOPKINS, of Lyndonville, in the county of Caledonia and State of Vermont, have invented a new and useful Improved Water or Steam Valve; and I do hereby declare that the following is a full, clear, and exact description thereof, reference being had to the accompanying drawing making a part of this specification, and to the letters of reference marked thereon, in which—

Figure 1:
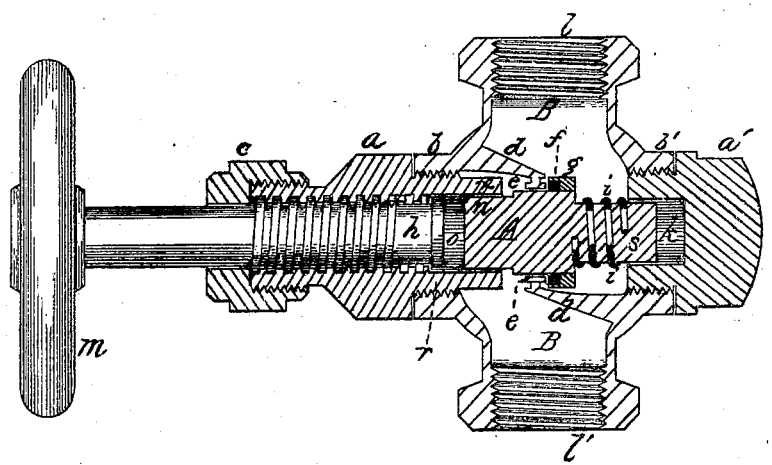
Figure 2:
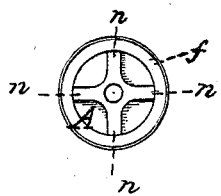

Figure 1 is a longitudinal section through the valve and its shell, and Fig. 2 is a front view of the valve itself.

My invention relates to the construction of a water or steam valve, whereby the same will fit perfectly to its seat by the pressure of the water or steam upon it, and whereby the seat is made double, so that in case one seat becomes worn the valve or plug may be taken from its seat upon one side of the partition and inserted into the shell upon the opposite side of the partition against its other seat, and the valve thus may be made to perform the service, in durability, of two valves; and it also consists of the construction and arrangement of the valve with its packing and a spring, whereby the said packing will be capable of greater durability than when used in the ordinary valves, and when worn out it may be easily replaced with new packing.

That others skilled in the art may be able to make and use my invention, I will proceed to describe its construction and operation.

In the drawing, B represents a common globe-valve shell, having upon either side a cylindrical neck, $b$, both of which are of the same inside diameter, and both of which have a screw-thread made upon the inside. $a$ represents the spindle or stem nut, through which the stem or spindle operates by means of a screw-thread in the usual manner, and which nut has a thread made upon its inner end, which fits the screw-thread made upon the inside of the neck $a$. Upon the inside of the neck $b$, which is of the same inside diameter as the neck $a$, is made also a thread, which is of the same size as that in the neck $a$, and the nut $a'$, which is recessed at $k$, has a thread therein, which fits the thread in the neck $b'$. A partition, $d$, is made obliquely across the interior of the shell B, in which partition is made a slight annular projection, $e$, projecting from each side of the said partition, which projection on either side forms the seat of the valve. The valve or plug A is of cylindrical form, having an annular projection, $g$, behind which is a shank, $s$, which is inserted in the recess $k$, and around the shank $s$ is placed a spiral spring, $i$, one end of which bears against the inner end of the nut $a'$, and the other end bears against the annular projection $g$. An annular groove or channel is made in one side of the annular projection $g$, which groove is filled with "Babbitt" metal or other equivalent soft metal, shown at $f$, and the exposed surface of this soft metal impinges against the annular projection or seat $e$. The nut $a$ has a recess, $o$, therein, at the inner end, and this recess, together with the recess $k$ in the nut $a'$, serves as guides to keep the plug or valve A always concentric with its seat $e$. A packing-nut, $c$, is attached to the nut $a$ by a screw-thread in the usual manner.

The operation of the device is as follows: The connections with the steam or water pipes are made at $l$ and $l'$, and, with the valve in the position shown in Fig. 1, steam or water is taken in at $l$. The valve is opened by turning the stem $h$ into the nut $a$ until the end pushes the plug A back into the recess $k$, forcing the annular projection $g$ with the soft metal therein away from the seat $e$, and the steam or water is then free to pass through. If the stem $h$ be turned out again, the pressure of the steam or water will generally be sufficient to close the valve; but in case such pressure is not sufficient, the action of the spring $i$ closes the valve, and, the metal $f$ being softer than the metal seat $e$, it becomes better fitted to the seat the longer it is used. Should the soft metal $f$ become worn out, the nut $a'$ is turned out, the plug A taken out, and the worn-out soft metal renewed, as is usually done with soft-metal packing. This may be done as long as the seat $e$ remains intact; but should the seat become worn or injured, both nuts $a$ and $a'$ are reversed, the nut $a$ being put in the place of the nut $a'$, and the nut $a'$ occupying the place of the nut $a$, the plug or valve A being also changed to the other side of the partition $d$. This brings the soft metal against the seat $e$, opposite to that against which it had previously rested, and the globe B is also changed with reference to its connection with the steam or water pipes, as it is always necessary to take in steam or water upon that side of the partition $d$ occupied by the annular projection $g$ and spring $i$.

It will thus be seen that this device has the advantage of much greater durability over the valves now in common use, while it is free from complication, and is not liable to get out of order, and in case of injury the parts are easily removed and accessible for repair.

I am aware that valves have heretofore been made having a soft-metal packing; but such packing has been connected with the stem or spindle, so that by turning the spindle into the valve the soft metal was ground down upon the seat; and in such applications of it the soft metal is flaked or peeled off, and the packing soon wears out. I do not, therefore, claim a soft-metal packing, irrespective of my application of it to and arrangement with a plug, constructed and operating substantially as described; but, Having described my invention, what I do claim as new, and desire to secure by Letters Patent, is—

1. I claim a valve having the nuts $a$ and $a'$, which are interchangeable, and having a seat, $e$, on either side of the partition $d$, against which the plug A is held by the pressure of steam or water, and the spring $i$, substantially as described.

2. I claim, in an improved valve, the plug A, having an annular groove made therein, which is filled with soft-metal packing $f$, when said plug is constructed substantially as described, and is held to its seat $e$ by the pressure of steam or water within the shell, and the spring $i$, substantially as set forth.

CHARLES H. HOPKINS.

Witnesses:
T. A. CURTIS,
CLARENCE BUCKLAND.